(12) United States Patent
Ebata

(10) Patent No.: US 8,526,980 B2
(45) Date of Patent: Sep. 3, 2013

(54) METHOD OF AND APPARATUS FOR ESTIMATING RECEIVED QUALITY OF COMMUNICATION AREA AND PROGRAM

(75) Inventor: Koichi Ebata, Tokyo (JP)

(73) Assignee: NEC Corporation, Tokyo (JP)

( * ) Notice: Subject to any disclaimer, the term of this patent is extended or adjusted under 35 U.S.C. 154(b) by 1144 days.

(21) Appl. No.: 11/721,190

(22) PCT Filed: Jun. 15, 2006

(86) PCT No.: PCT/JP2006/312025
§ 371 (c)(1),
(2), (4) Date: Jun. 8, 2007

(87) PCT Pub. No.: WO2006/135004
PCT Pub. Date: Dec. 21, 2006

(65) Prior Publication Data
US 2009/0239532 A1 Sep. 24, 2009

(30) Foreign Application Priority Data
Jun. 15, 2005 (JP) .................................. 2005-174439

(51) Int. Cl.
*H04W 4/00* (2009.01)
*H04W 36/00* (2009.01)
*H04W 24/00* (2009.01)
*H04W 40/00* (2009.01)

(52) U.S. Cl.
USPC ........ 455/466; 455/436; 455/422.1; 455/423; 455/448; 370/338

(58) Field of Classification Search
USPC ....... 455/466, 436, 422.1, 423, 448; 370/338
See application file for complete search history.

(56) References Cited

U.S. PATENT DOCUMENTS

| 6,304,754 | B1 * | 10/2001 | DeSantis et al. | 455/436 |
| 7,756,523 | B2 | 7/2010 | Ebata | |
| 2003/0186654 | A1 * | 10/2003 | Shigemura et al. | 455/67.13 |
| 2004/0029532 | A1 * | 2/2004 | Schwarz et al. | 455/63.1 |

FOREIGN PATENT DOCUMENTS

| EP | 1523131 A2 | 4/2005 |
| JP | 6-209279 A | 7/1994 |
| JP | 2000-101596 A | 4/2000 |
| JP | 2000-333239 A | 11/2000 |
| JP | 2001-094502 A | 4/2001 |
| JP | 2001-285923 A | 10/2001 |
| JP | 2001-352287 A | 12/2001 |
| JP | 2002-204199 A | 7/2002 |
| JP | 2004-056509 A | 2/2004 |
| JP | 2004-59835 | 2/2004 |
| JP | 2004-201166 A | 7/2004 |
| JP | 2005-252623 | 9/2005 |

* cited by examiner

*Primary Examiner* — Ariel Balaoing
(74) *Attorney, Agent, or Firm* — Dickstein Shapiro LLP

(57) ABSTRACT

An area to be estimated is sectioned to minute sections, the received signal qualities from a plurality of installed base stations (51, 52) are found, respectively in each of the minute sections, a difference between the received signal quality of each minute section and the received signal quality of a minute section adjacent to the above minute section is referred to as well as a change point at which a difference between a received signal quality used as a hand-over condition and the above received signal quality changes is detected so that an area in which a hand-over occurs can be accurately estimated. With this manner, there can be obtained a received signal quality estimation method capable of estimating an area in which a hand-over occurs very accurately in a mobile communication system.

30 Claims, 14 Drawing Sheets

FIG. 6

| POINT-OF-OBSERVATION GRID NO. | RECEIVED POWER [dBm] FROM BASE STATION 51 | RECEIVED POWER [dBm] FROM BASE STATION 52 |
|---|---|---|
| 1 | -65 | -92 |
| ... | ... | ... |
| 17 | -64 | -72 |
| 18 | -71 | -67 |
| ... | ... | ... |
| 29 | -60 | -68 |
| ... | ... | ... |
| 68 | -77 | -60 |
| 69 | -80 | -45 |
| ... | ... | ... |
| 80 | -78 | -74 |
| ... | ... | ... |

FIG. 9

| POINT-OF-OBSERVATION GRID NO. | RECEIVED POWER [dBm] FROM BASE STATION 51 | RECEIVED POWER [dBm] FROM BASE STATION 52 |
|---|---|---|
| 1 | -65 | -92 |
| ... | ... | ... |
| 30 | -71 | -67 |
| ... | ... | ... |
| 66 | -71 | -70 |
| ... | | ... |

METHOD OF AND APPARATUS FOR ESTIMATING RECEIVED QUALITY OF COMMUNICATION AREA AND PROGRAM

TECHNICAL FIELD

The present invention relates to a received signal quality estimation method of estimating a hand-over area in a communication area in a mobile communication system.

BACKGROUND ART

Since a hand-over greatly affects a communication quality in a mobile communication system in which a user moves, it is preferable to estimate and to acquire an area in which the hand-over is carried out (hereinafter, referred to as hand-over area) in design and operation. When the hand-over area becomes apparent, it is possible to make a design in which a hand-over occurs less frequently and to determine a failure caused by a hand-over in operation.

Exemplified as a conventional hand-over estimation method is "AirMagnet Surveyor (http://www.toyo.co.jp/wlan/d_airmagnet_sv.html, http://www.airmagnet.com/)" which is a commercially available site survey tool. The tool displays the receiving powers in respective points in respective in colors (using different colors in respective contours) based on an estimation carried out by actually measuring the received power from a base station in wireless LAN. As one of the functions of the tool, there is provided a function for displaying an area, in which areas covered by a plurality of base stations overlap, as a hand-over area.

In contrast, an actual hand-over processing is carried out when two conditions, that is, a condition that the received signal quality from an associated base station is equal to or less than a prescribed value (shown by Qth) and a condition that a difference between the received signal quality of a destination base station and the received signal quality of the associated base station is equal to or more than a prescribed value (shown by h). Exemplified, as examples of the received signal quality are received power, delay spread, SNR (signal-to-noise power ratio), SIR (signal-to-interference noise power ratio), transmission loss, error rate (bit error rate and block error rate), and the like. It is also possible to use one or a plurality of combinations of them.

Accordingly, a terminal in transit monitors the received signal quality of an associated base station and the received signal quality of the base station having the best received signal quality in the base stations other than the associated base station, and carries out a hand-over processing at the time the above conditions are achieved. However, the area including the overlapping covered areas which is provided by the site survey tool is an area in which both the received signal quality of the associated base station and the received signal qualities of the other base stations are better than a prescribed quality and is different from an area shown by the above conditions. That is, since an actual hand-over is determined from a difference between the received signal quality of an associated base station and the received signal quality of a hand-over destination base station and carried out when a hand-over achieving condition changes, an area, in which covered areas simply overlap, does not agree with a hand-over area.

Note that Patent Documents 1, 2 are exemplified as technologies for measuring received signal qualities at a plurality of locations in a service area in a mobile communication system and determining a pattern for disposing base stations based on a result of the measurement.

[Patent Document 1] JP-A 2000-333239
[Patent Document 2] JP-A 2001-285923

DISCLOSURE OF THE INVENTION

The conventional art described above is disadvantageous in that a hand-over area cannot be accurately estimated. This is because a hand-over is not carried out in an area in which covered areas simply overlap in the actual hand-over condition. Further, when disposition of base stations in a service area is determined, the technologies disclosed in the above patent documents 1, 2 do not estimate an area in which a hand-over will be carried out.

An object of the present invention, which was made in view of the above problems, is to provide a method of and apparatus as well as a program for estimating the received signal quality of a communication area that can estimate a hand-over area more accurately in a mobile communication system.

Other object of the present invention is to provide a method of and apparatus as well as a program for estimating the received signal quality of a communication area that can estimate the frequency of a hand-over by extracting a hand-over area to which a user may transit with respect to the hand-over area estimated as described above.

In a received signal quality estimation method of a wireless communication area according to the present invention for estimating an area in which a hand-over occurs in a service area of a wireless communication system composed of a plurality of base stations, the method includes a first step of finding the received signal qualities from a plurality of base stations at an arbitrary location in the service area, and a second step of estimating that the arbitrary location is an hand-over area referring to the received signal qualities.

In a received signal quality estimation apparatus of a wireless communication area according to the present invention for estimating an area in which a hand-over occurs in a service area of a wireless communication system composed of a plurality of base stations, the apparatus includes a received signal quality find means for finding the received signal qualities from a plurality of base stations at an arbitrary location in the service area and a hand-over area estimation means for estimating that the arbitrary area is a hand-over area referring to the received signal qualities.

In a program for causing a computer to carry out an operation of an apparatus for estimating an area in which a hand-over occurs in a service area of a wireless communication system composed of a plurality of base stations, the program includes a first processing of finding the received signal qualities from a plurality of base stations at an arbitrary location in the service area, and a second processing of estimating that the arbitrary area is a hand-over area referring to the received signal qualities.

Operation of the present invention will be described. An area to be estimated is sectioned to minute sections, the received signal qualities from a plurality of installed base stations are found, respectively in each of the minute sections, a difference between the received signal quality of each minute section and the received signal quality of a minute section adjacent to the above minute section is referred to as well as a change point at which a difference between a received signal quality used as a hand-over condition and the above received signal quality changes is detected so that an area in which a hand-over occurs can be accurately estimated.

Effect of the Invention

According to the present invention, since a method of determination having a condition equivalent to an actual hand-over condition can be achieved by determining an area in which a hand-over achieving condition changes by referring to the received signal quality of an associated base station and to a difference between the received signal quality of the associated base station and the received signal quality of a hand-over destination base station, there is an advantage that a hand-over area can be accurately estimated. Further, according to the present invention, since a hand-over area to which a user may transit is extracted by coupling the information of transit frequency of the user with the accurately estimated hand-over area, there is an advantage that the frequency of hand-over can be estimated.

BRIEF DESCRIPTION OF THE DRAWINGS

FIG. 6 is a view showing an example of received powers at the respective point-of-observation grids of FIG. 5;

FIG. 9 is a view showing an example of received powers at the respective point-of-observation grids of FIG. 8;

Figure 1:
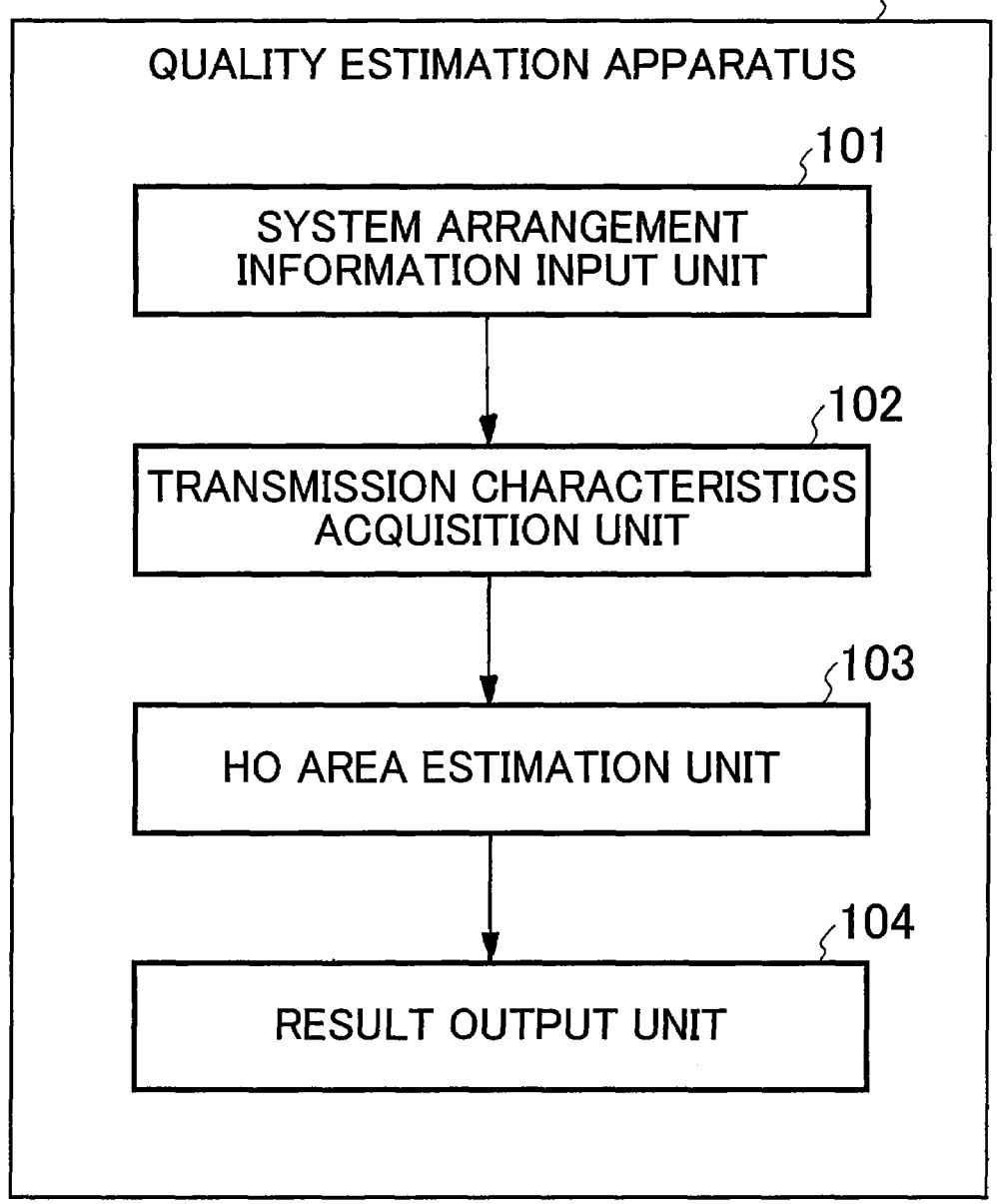
FIG. 1 is a schematic function block diagram of a quality estimation apparatus according to first and second embodiments of the present invention.

REFERENCE NUMERALS 1 quality estimation apparatus
101 system arrangement information input unit
102 propagation characteristics acquisition unit
103 HO (hand-over) area estimation unit
104 result output unit
105 traffic line find unit
106 HO (hand-over) occurrence frequency calculation unit
107 result display unit

BEST MODE FOR CARRYING OUT THE INVENTION

First Embodiment

Embodiments of the present invention will be explained below in detail with reference to the drawings. FIG. 1 is a schematic function block diagram of a quality estimation apparatus according to a first embodiment of the present invention. Referring to FIG. 1, the quality estimation apparatus 1 of the present invention includes a system arrangement information input unit 101, a propagation characteristics acquisition unit 102, an HO area estimation unit 103, and a result output unit 104. Note that a hand-over is abbreviated as HO in the view.

The system arrangement information input unit 101 inputs the information of users and the like in addition to the information of constructions in a wireless communication area to be estimated and the information of a wireless communication system. The propagation characteristics acquisition unit 102 acquires propagation characteristics referring to the information of a base station provided from the system arrangement information input unit 101 and finds a received signal quality. The HO area estimation unit 103 estimates a hand-over area referring to the received signal quality acquired by the propagation characteristics acquisition unit 102 and records it. The result output unit 104 outputs a hand-over area estimated by the HO area estimation unit 103 using a display and the like.

Figure 2:
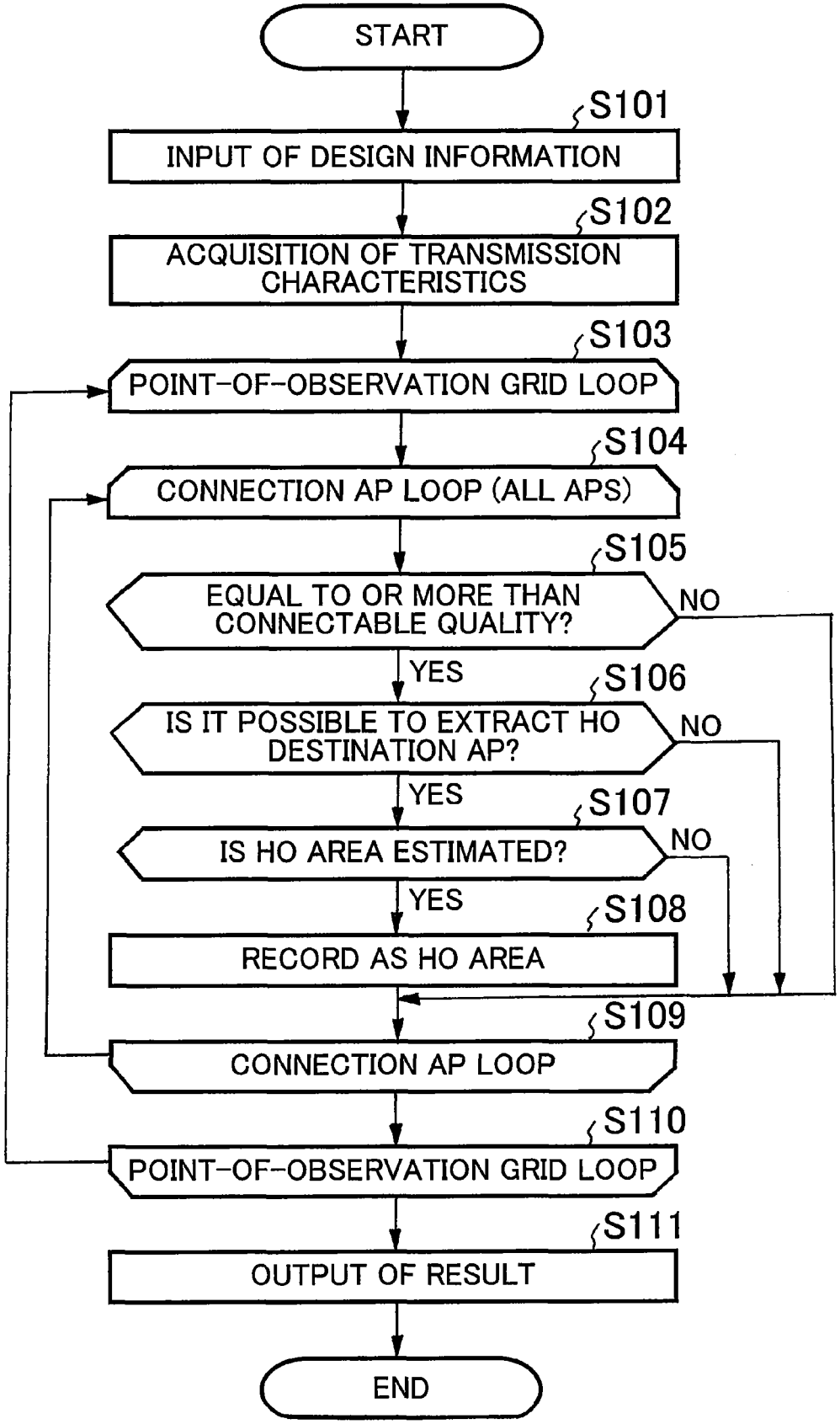
FIG. 2 is a flowchart showing an operation of the first and second embodiments of the present invention.

FIG. 2 is a flowchart showing an operation of the first embodiment of the present invention. The operation of the first embodiment of the present invention will be explained using FIGS. 1 and 2. At step S101, an operator inputs design information as to constructions in a wireless communication area to be estimated, a wireless communication system, and a user using the system arrangement information input unit 101. Specifically, the user inputs a map of an area to be estimated, a drawing of a building floor and the like, information of respective constructions, locations where base stations are installed, a transmission power, directionality of an antenna, and the like.

At step S102, the propagation characteristics acquisition unit 102 acquires propagation characteristics using the information input by means of the system arrangement information input unit 101. When each of sections obtained by sectioning the area to be estimated to minute sections is defined as a point-of-observation grid, the data of the thus acquired propagation characteristics shows the received signal qualities from respective base stations at the respective point-of-observation grids. As a specific method of acquiring the propagation characteristics, simulation may be carried out using known methods such as a ray tracing method, a statistic estimation method, and the like, or radio waves may be transmitted from an actually installed base station and received and measured using a measuring device.

At step S103 and subsequent steps, the HO area estimation unit 103 estimates a hand-over area. Step S103 is a loop end at which estimation is carried out to each of the point-of-observation grids. Hereinafter, a point-of-observation grid subjected to an estimation processing is called a point-of-observation grid to be estimated. Step S104 is a loop end at which estimation is carried out to each of the base stations.

Note that in the drawings, the base station is abbreviated as AP as an access point. Hereinafter, a base station in connection subjected to an estimation processing is called an associated base station to be estimated. Although estimation is carried out at the respective point-of-observation grids assuming the respective base stations as the associated base stations, a reason why such a processing is carried out resides in that a hand-over may be carried out to a different associated base station even in the same location depending a moving behavior of a user having a terminal.

It is determined at step S105 whether or not a point-of-observation grid to be estimated can be connected to an associated base station to be estimated. When the received signal quality from an associated base station to be estimated in a point-of-observation grid to be estimated does not satisfy minimum quality for permitting communication, the associated base station to be estimated cannot act as an associated base station. When the determination at step S105 is No, since the associated base station to be estimated cannot act as a hand-over area, the process goes to step S109. Whereas, when the determination at step S105 is Yes, since the associated base station to be estimated may act as the hand-over area, the process goes to step S106.

At step S106, a base station which becomes a candidate of a hand-over destination (hereinafter, called a hand-over destination base station) is extracted with respect to the associated base station to be estimated in the point-of-observation grid to be estimated. A base station to be extracted as the hand-over destination base station must satisfy the condition that it is a base station other than the associated base station to be estimated and has the best received signal quality in a point-of-observation grid to be estimated as well as the received signal quality thereof satisfies minimum quality for carrying out communication. When an extracted base station does not satisfy the minimum quality, since the point-of-observation grid to be estimated cannot act as the hand-over area, the process goes to step S109. Whereas, when the extracted base station satisfies the minimum quality, since the point-of-observation grid to be estimated may act as the hand-over area, the process goes to step S107.

At step S107, when the point-of-observation grid to be estimated is the associated base station to be estimated, it is determined whether or not a hand-over is carried out. When any of the following conditions 1 and 2 is satisfied, it is estimated that the point-of-observation grid to be estimated is the hand-over area. Note that Qth is defined as a prescribed value as to the received signal quality from the associated base station to be estimated, and h is defined as a prescribed value of a difference between the received signal quality of the associated base station to be estimated and the received signal quality of the hand-over destination base station.

Condition 1: As to the received signal quality of a point-of-observation grid to be estimated and the quality of a grid adjacent to the above grid (hereinafter, called an adjacent grid), a case that the received signal quality of the associated base station to be estimated in the adjacent grid is equal or less than the predetermined prescribed value Qth, a difference between the received signal quality of the associated base station to be estimated in the point-of-observation grid to be estimated and the received signal quality of the hand-over destination base station is less than the predetermined prescribed value h, and a difference between the received signal quality of the associated base station to be estimated in the adjacent grid and the received signal quality of the hand-over destination base station is equal to or more than the predetermined prescribed value h.

Condition 2: A case that a difference between the received signal quality of the associated base station to be estimated and the received signal quality of the hand-over destination base station is equal to or more than the predetermined prescribed value h in the adjacent grid, the received signal quality from the associated base station to be estimated is equal to or more than the predetermined prescribed value Qth in the point-of-observation grid to be estimated, and the received signal quality from the associated base station to be estimated is less than the predetermined prescribed value Qth in the adjacent grid.

As described above, it is possible to detect a point at which a hand-over achieving condition changes by taking the received signal quality of the associated base station to be estimated and the difference between the received signal quality of the associated base station to be estimated and the received signal quality of the hand-over destination base station as well as detecting that the received signal quality changes across the prescribed value between the point-of-observation grid to be estimated and the adjacent grid thereof. As a result, it is possible to estimate an area having the same condition as an actual hand-over condition.

It should be noted that since it is assumed in the first embodiment that a hand-over occurs when the user transits from a point-of-observation grid to be estimated to an adjacent grid, it is sufficient, as to the determination of the minimum quality described above that the received signal quality of the associated base station to be estimated in the point-of-observation grid to be estimated and the received signal quality of the hand-over destination base station in the adjacent grid satisfy the minimum quality.

Further, when an area, in which a hand-over is carried out, is estimated by the above method with respect to radio wave propagation characteristics acquired using the simulation and the like, a redundant area may be estimated. This is because only the received signal quality is simply used as a material of determination, and thus the area can be more restricted in consideration of an actual operation. To further restrict the area, any one or both of the following restrictions may be added.

Restriction 1: When a distance between an associated base station to be estimated and a point-of-observation grid to be estimated and a distance between the associated base station to be estimated and an adjacent grid are calculated, it is assumed that the associated base station to be estimated is a hand-over area only when the former distance is larger than the latter distance, that is, only when a transit from the point-of-observation grid to be estimated to the adjacent grid means an increase of a distance from the associated base station to be estimated. This is because an increase of a distance from a base station being connected ordinarily causes a hand-over to shift to another base station as an actual operation.

Restriction 2: when h' (h'>h) is defined as a prescribed value of a difference between the received signal quality of an associated base station to be estimated and the received signal quality of a hand-over destination base station, it is assumed that the associated base station to be estimated is not a hand-over area when a difference between the received signal quality of the associated base station to be estimated and the received signal quality of the hand-over destination base station is equal to or more than h' in both a point-of-observation grid to be estimated and an adjacent grid. This is because when the received signal quality of the hand-over destination base station is already sufficiently large at both the grids, it is contemplated that there is a large possibility that a hand-over is already carried out before the point-of-observation grid to be estimated is reached.

At step S107, when it is estimated that the associated base station to be estimated is the hand-over area, the process goes to S108 at which it is recorded that when the point-of-observation grid to be estimated is the associated base station to be estimated, the associated base station is a hand-over area in which a hand-over is carried out to the hand-over destination base station. When it is not estimated that the associated base station is the hand-over area, the process goes to step S109.

Step S109 is a loop end at which it has been estimated whether or not a hand-over is carried out when an associated base station to be estimated is connected in a point-of-observation grid to be estimated. Then, the process returns from step S109 to step S104 at which the associated base station to be estimated is changed to other associated base station, and the above processes are repeated until all the base stations are processed as associated base stations to be estimated by carrying out the flows at step S105 and subsequent steps.

Step S110 is a loop end at which estimation has been finished when respective base stations are assumed as associated base stations in one point-of-observation grid to be estimated. Then, the process returns from step S110 to step S103 at which the point-of-observation grid to be estimated is changed to other point-of-observation grid, and the above processes are repeated until all the point-of-observation grids are processed as point-of-observation grids to be estimated by carrying out the flows at step S104 and subsequent steps.

When all the base stations are assumed as the associated base stations by the above operation flows in all the point-of-observation grids, whether or not they are used as hand-over areas are estimated. The HO area estimation unit 103 outputs a result of estimation to the result output unit 104.

At step S111, the result output unit 104 outputs the result of estimation of the hand-over area. When the result of estimation is output, a color or a pattern of each of the point-of-observation grids is changed according to the result of estimation of the hand-over area. Expression of a received signal quality by the color or the pattern makes it easy to observe the result of estimation over the overall area to be estimated. As a specific method of outputting the result, the point-of-observation grids are overlapped on a map of an area to be estimated and on the information of constructions such as building floor views and the like using, for example, a display apparatus such as a display and the like and displaying only hand-over areas in colors. The positional relation of actual constructions and the hand-over areas can be easily found by an observer by displaying them in colors, and this arrangement can be easily used in design and operation.

Second Embodiment

Next, a second embodiment of the present invention will be explained. In the second embodiment, the processing at step S107 of FIG. 2 which shows the operation flow of the first embodiment described above will be carried out as described below. It is assumed that the function block of a quality estimation apparatus and the operation flows other than the above operation flow of the embodiment are the same as those of the first embodiment described above.

When a point-of-observation grid to be estimated is an associated base station to be estimated, it is estimated at step S107 whether or not a hand-over is carried out, and, in the embodiment, it is estimated that the point-of-observation grid to be estimated is a hand-over area when any of the following conditions 3 and 4 is satisfied. Note that Qth1 and Qth2 are defined as prescribed values as to the received signal quality from the associated base station to be estimated, and h1 and h2 are defined as prescribed values of a difference between the received signal quality of an associated base station to be estimated and the received signal quality of a hand-over destination base station, respectively.

Condition 3: As to the received signal qualities of a point-of-observation grid to be estimated and an adjacent grid, a case that the received signal quality from an associated base station to be estimated is equal to or less than Qth1 as well as a difference between the received signal quality from the associated base station to be estimated and the received signal quality from a hand-over destination base station is equal to or more than h1 and equal to or less than h2.

Condition 4: A case that a difference between the received signal quality of the associated base station to be estimated and the received signal quality of the hand-over destination base station is equal to or more than h1 as well as the received signal quality from the associated base station to be estimated is equal to or more than Qth1 and equal to or less than Qth2.

As described above, since the received signal quality of the associated base station to be estimated and a difference between the received signal quality of the associated base station to be estimated and the received signal quality of the hand-over destination base station are taken into consideration as well as it is assumed that a point at which a hand-over condition is achieved changes by detecting that the difference is within the range of the two values, thereby it is possible to estimate an area having the same hand-over condition as an actual hand-over condition.

Since the second embodiment need not compare a point-of-observation grid with other point-of-observation grid different from the first embodiment described above, a processing can be carried out at a high speed. Further, when a transit speed is higher than a transit speed of an average user at a time Qth1, Qth2, h1, and h2 are determined, since the width of Qth1 and Qth2 and the width of h1 and h2 are increased, respectively, the hand-over area can be more accurately estimated. This is because when received signal qualities are measured from an associated base station and a hand-over destination base station, the user moves a long distance from a measurement point to a next measurement point when a moving speed is high.

Third Embodiment

Next, a third embodiment of the present invention will be explained. In the third embodiment, the hand-over area estimated using the first and second embodiments described above are weighed depending on the moving property of a user using a terminal as a mobile device such the traffic lines of the user in a map and in a building floor view, thereby a frequency of occurrence of hand-over is estimated.

Figure 3:
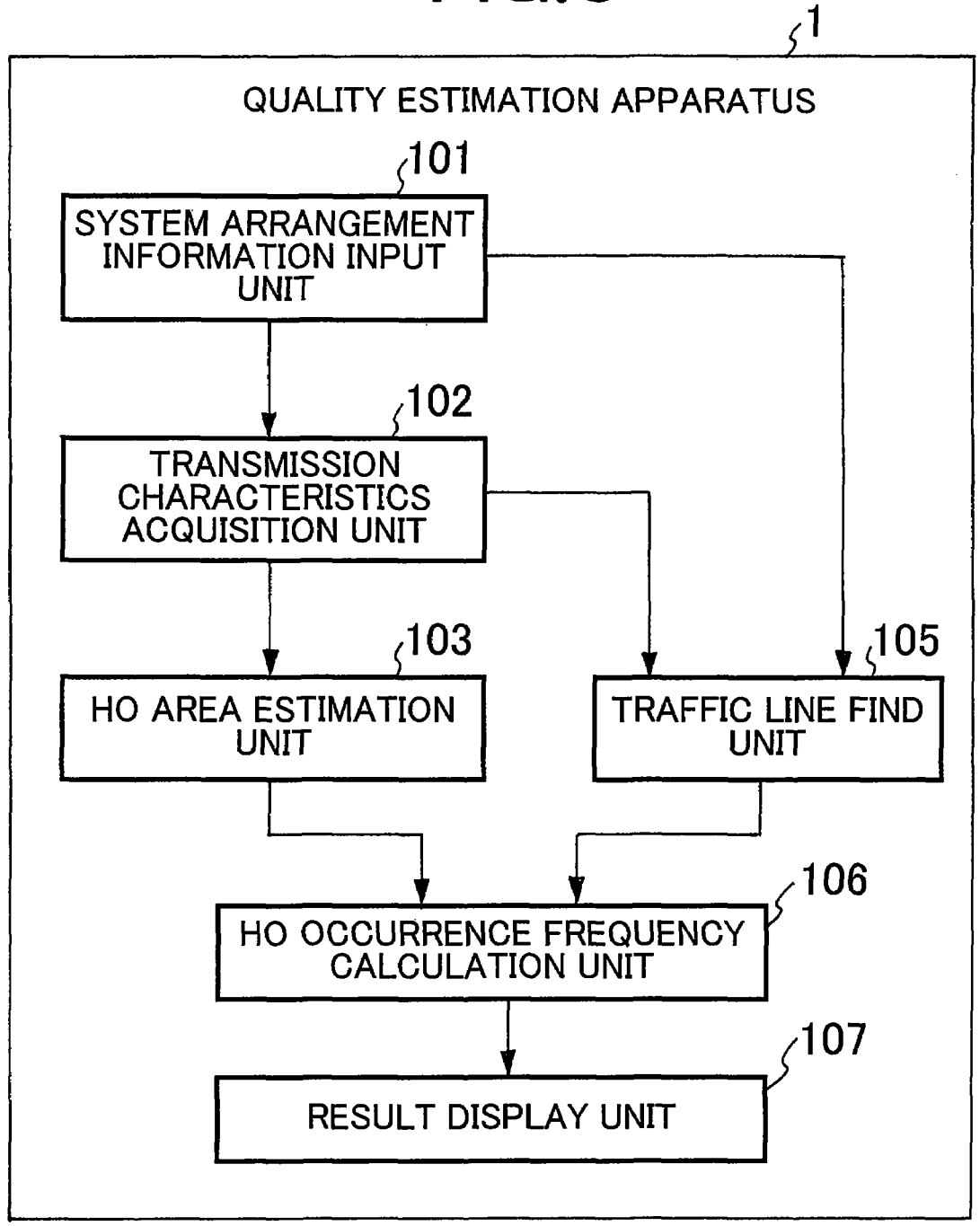
FIG. 3 is a schematic function block diagram of a quality estimation apparatus according to a third embodiment of the present invention.

FIG. 3 is a function block diagram of a quality estimation apparatus according to the third embodiment, wherein the same portions as those of FIG. 1 are denoted by the same reference numerals. The quality estimation apparatus 1 is composed of a system arrangement information input unit 101, a propagation characteristics acquisition unit 102, an HO area estimation unit 103, a traffic line find unit 105, an HO occurrence frequency calculation unit 106, a result display unit 107.

Figure 4:
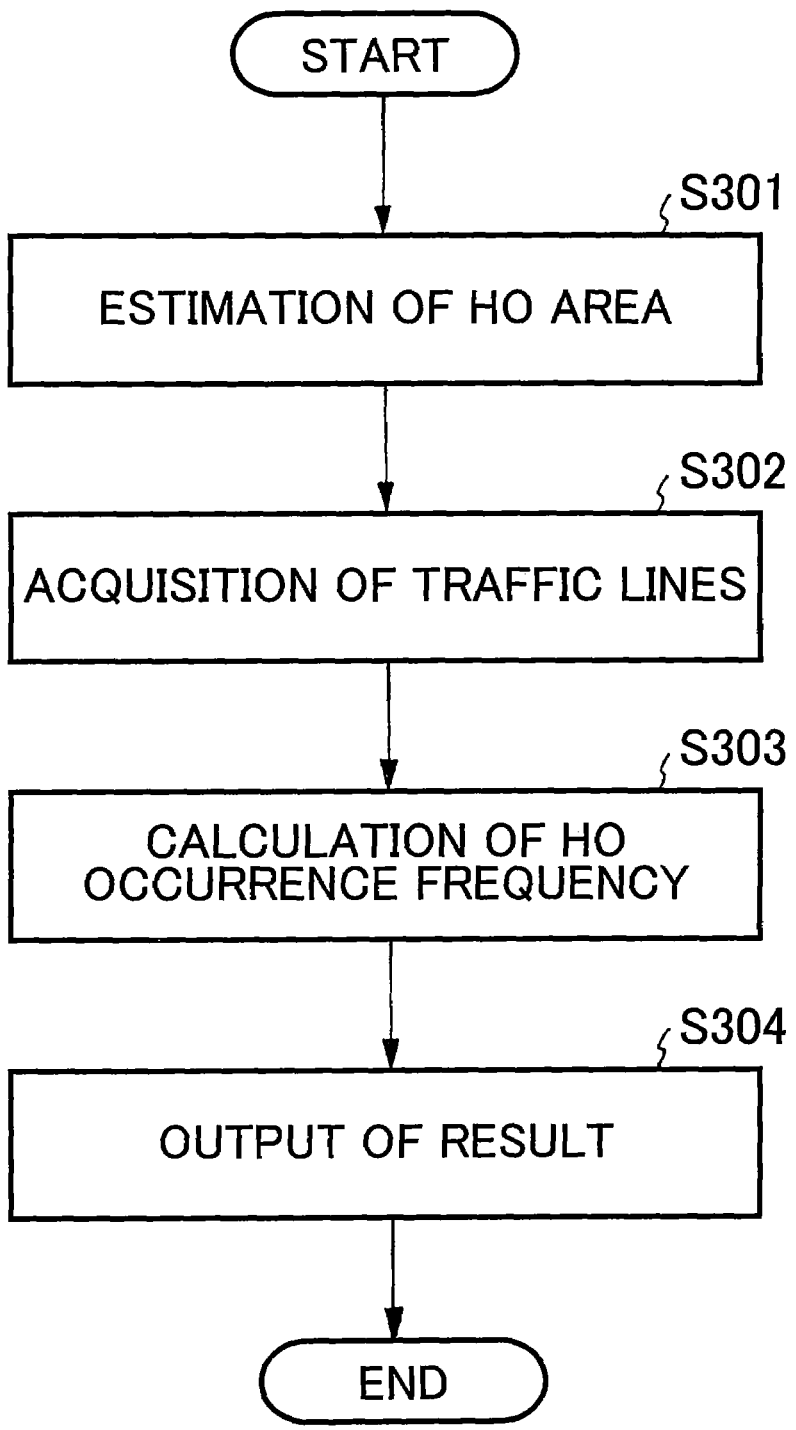
FIG. 4 is a flowchart showing an operation of the third embodiment of the present invention.

It is assumed that the system arrangement information input unit 101 includes the traffic line information of a user in an area to be estimated, and the like. FIG. 4 is a processing flowchart showing an operation of the embodiment. The operation of the embodiment will be explained referring to FIGS. 3 and 4.

First, at a step S301 of FIG. 4, a hand-over area is estimated using the methods of the previous first and second embodiments. Next, at step S302, the traffic line find unit 105 calculates a transit frequency of each of point-of-observation grids prescribed by the propagation characteristics acquisition unit 102 referring to the traffic line information of the user obtained from the system arrangement information input unit 102. An example of a specific method of calculating the transit frequency includes a method of counting the number of traffic lines passing on respective point-of-observation grids and showing them by numerical values.

At step S303, the frequency of occurrence of hand-over is calculated by coupling the hand-over area and the transit frequency of each point-of-observation grid derived at steps S301 and S302. As a specific example of calculation, the numerical value of the transit frequency obtained at step S302 is multiplied by "1" when it is estimated that the point-of-observation grid is a hand-over area and multiplied by "0" when it is not estimated that the point-of-observation grid is the hand-over area so that only a point-of-observation grid which becomes the hand-over area on a traffic line has a value.

At step S304, the frequency of occurrence of hand-over calculated at step S303 is displayed. The frequency of occurrence of hand-over is displayed in colors and patterns according to the value thereof calculated at step S303 as to each of the point-of-observation grids using a display device such that it is overlapped on a map and a floor view. As described above, when the result of estimation of the frequency of occurrence of hand-over is displayed by being overlapped on the map of an area to be estimated and on the building floor view, an area having a high frequency of occurrence of hand-over can be easily found. As a result, the frequency of occurrence of hand-over can be reduced by adjusting the locations where base stations are installed and a transmission power in design.

Fourth Embodiment

Next, a fourth embodiment of the present invention will be explained. In the fourth embodiment, the processing at a step S107 of FIG. 2 which shows the operation flow of the first embodiment described above will be carried out as described below. It is assumed that the function block of a quality estimation apparatus and the operation flows other than the above operation flow of the embodiment are the same as those of the first embodiment described above.

When a point-of-observation grid to be estimated is a base station to be estimated, it is estimated at step S107 whether or not the point-of-observation grid to be estimated becomes a communication-unstable area in which a hand-over cannot be carried out. When the following condition 5 is satisfied, it is estimated that the point-of-observation grid to be estimated is the communication-unstable area. Note that Qth is defined as a prescribed value as to the received signal quality from an associated base station to be estimated, and h is defined as a prescribed value of a difference between the received signal quality of the associated base station to be estimated and the received signal quality of a hand-over destination base station, respectively likewise the first embodiment.

Condition 5: a case that the received signal quality of an associated base station to be estimated in a point-of-observation grid to be estimated is equal to or less than the predetermined prescribed value Qth as well as a difference between the received signal quality of an associated base station to be estimated and the received signal quality of a hand-over destination base station is equal to or less than the predetermined prescribed value h.

As described above, when a hand-over destination base station does not have sufficient quality regardless that the received signal quality of the associated base station to be estimated is deteriorated to a quality which requires a hand-over, since it is anticipated that communication is carried out unstably, the associated base station to be estimated is defined as the communication-unstable area. When the communication-unstable area is displayed in colors by being overlapped on a map and on the information of constructions such as a building floor view, and the like using a display apparatus likewise the hand-over area, the positional relation of the actual constructions and the communication-unstable area can be found, thereby a parameter can be adjusted to reduce the communication-unstable area. It is possible to use the fourth embodiment in combination with the first and second embodiments.

EXAMPLES

First Example

Figure 5:
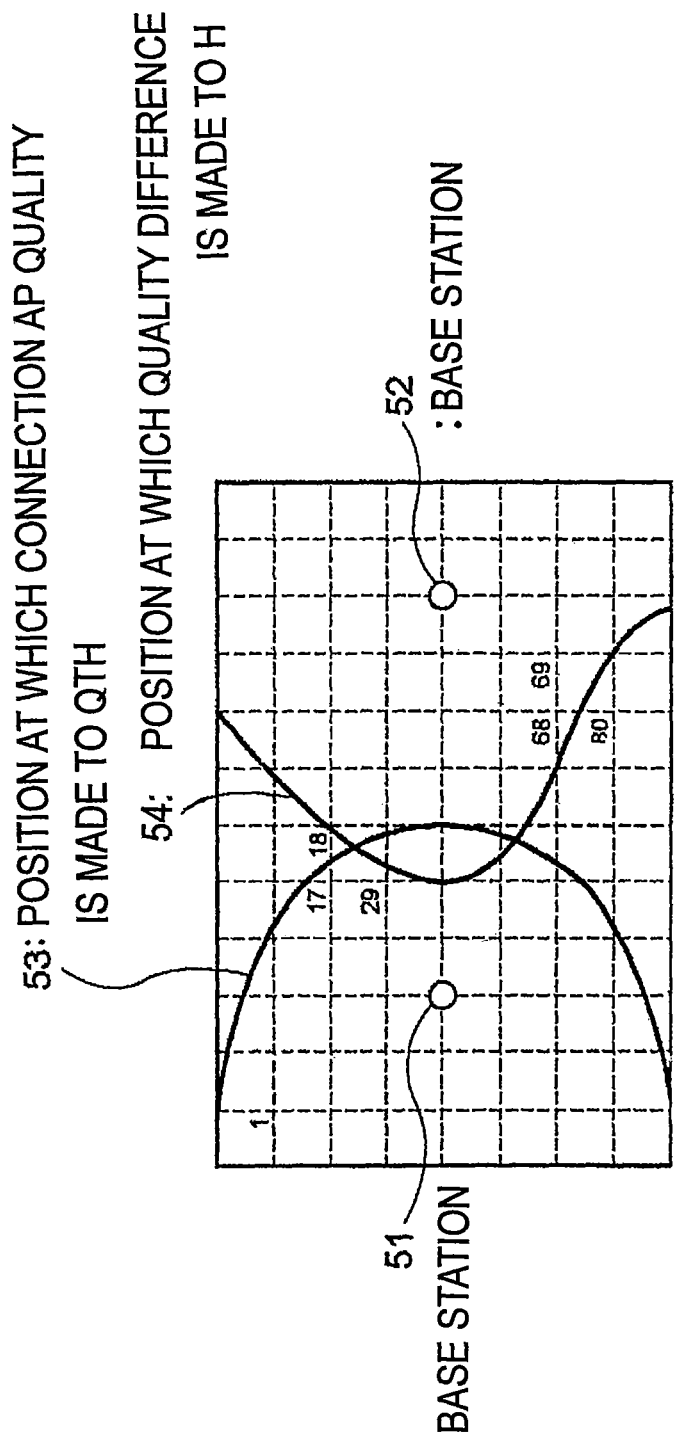
FIG. 5 is a schematic view explaining the first example of the present invention.

A first example according to the first embodiment of the present invention will be explained to better understand the first embodiment. FIG. 5 is a schematic view explaining the example in which an area to be estimated is partitioned in grids each corresponding to one point-of-observation grid, and identification numbers are given to the grids from an upper left side. Further, it is assumed that two base stations 51, 52 are installed. The received signal qualities from these base stations to the respective point-of-observation grids are acquired through steps S101 and S102 of FIG. 2, and data as shown in FIG. 6 is obtained in, for example, the respective grids shown in the figure.

One point-of-observation grid is processed at step S103, and one base station is processed as an associated base station at step S104. It is assumed here that a point-of-observation grid 17 is processed as a point-of-observation grid to be estimated, and a base station 51 is processed as an associated base station to be estimated. It is determined at step S105 whether or not the received signal quality from the base station 51 as the associated base station is connection possible quality in the point-of-observation grid 17. It is assumed here that a received power of −80 dBm is used as the connection possible quality (minimum quality). Since the received power from the base station 51 in the point-of-observation grid 17 is −64 dBm which is better than the connection possible quality, it is determined that associated base station can be connected.

Next, at step S106, a base station having the best received signal quality in the base stations other than the associated base station to be estimated is selected as a hand-over destination base station. In the example, however, since there is only the base station 52 except the base station 51, the base station 52 is selected as the hand-over destination base station. In the first example, it is not necessary to confirm the quality of the hand-over destination base station in the point-of-observation grid to be estimated.

At step S107, it is estimated whether or not the base station 52 is a hand-over area. Prescribed values Qth and h used in the estimation are set to −70 dBm and 5 dB, respectively.

When the hand-over area is estimated, first, the received signal quality of a point-of-observation grid 18 as an adjacent grid located on the right side of the point-of-observation grid 17 is confirmed. The received power from the base station 51 as the associated base station changes from −64 dBm to −71 dBm in the point-of-observation grids 17 and 18, which means that the received power changes across −70 dB that is the value of Qth. This agrees with a part of the condition 2. Next, since a difference between the received signal quality of the associated base station and the received signal quality of the hand-over destination base station is from −8 dB to 4 dB, and a difference of the received signal quality in the adjacent grid is less than the value h. In the relation to the right adjacent grid in the point-of-observation grid 17, the received power changes across Qth. However, since the difference of the received signal quality in the adjacent grid is less than h, it is not estimated that the base station 52 is the hand-over area.

In contrast, the received power from the base station 51 as the associated base station changes from −64 dBm to −60 dBm judging from the received signal quality of a point-of-observation grid 29 as an adjacent grid located under the point-of-observation grid 17, and both the values exceed −70 dBm that is the value Qth. Further, a difference between the received signal quality of the associated base station and the received signal quality of the hand-over destination base station is from −8 dB to −8 dB, and both the values are less than the value h. Accordingly, it is not estimated that the base station 52 is the hand-over area.

As described above, the hand-over area is estimated to the respective point-of-observation grids in an area to be estimated referring to the received signal quality of an adjacent grid. A point-of-observation grid 68 is exemplified as an example of a point-of-observation grid to be estimated as the hand-over area. In the point-of-observation grid 68 and a grid 80 located adjacent to the grid 68 on the lower side thereof, the received signal quality from the base station 51 as the associated base station changes from −77 dBm to −78 dBm, and the received signal quality in the adjacent grid is equal to or less than Qth (−70 dBm).

Further, a difference between the received signal quality of the base station 52 as the hand-over destination base station and the received signal quality of the base station 51 as the associated base station changes from 17 dB to 4 dB across 5 dB as the value h. Since the relation between both the grids satisfies the above condition 1, it is estimated that the point-of-observation grid 68 is the hand-over area. Note that, in FIG. 5, a curve 53 shows a position at which the received signal quality of a connection access point is made to Qth, and a curve 54 shows a position at which a difference between the received signal qualities is made to h.

Further, although the right and lower grids are used as the adjacent grids in the example, the same estimation may be carried out to all the directions such as up, left, right, upper right, lower right, upper left, and lower left directions, and the like.

Figure 7:
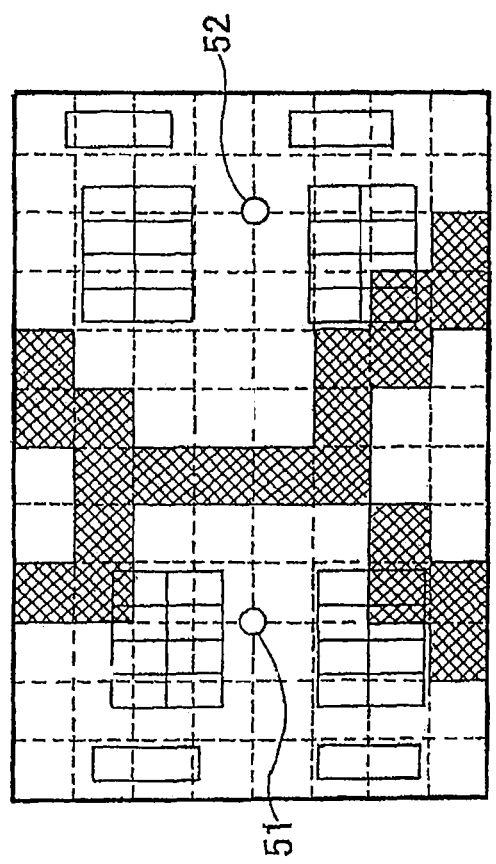
FIG. 7 is a view showing an example of an estimated hand-over area in an overall area to be estimated of FIG. 5.

The estimation of the hand-over area as described above is carried out using the respective base stations as the associated base stations to be estimated and the respective point-of-observation grids as the point-of-observation grids to be estimated. Although FIG. 7 displays the grids estimated as the hand-over areas in colors such as a red color while overlapping them on a building floor view to be estimated, they are shown by oblique hatchings. A room and desks are shown in a rectangular shape in the floor view. As described above, a location where a hand-over may occur can be easily confirmed by displaying the grids on a map and the building floor view.

Second Embodiment

Figure 8:
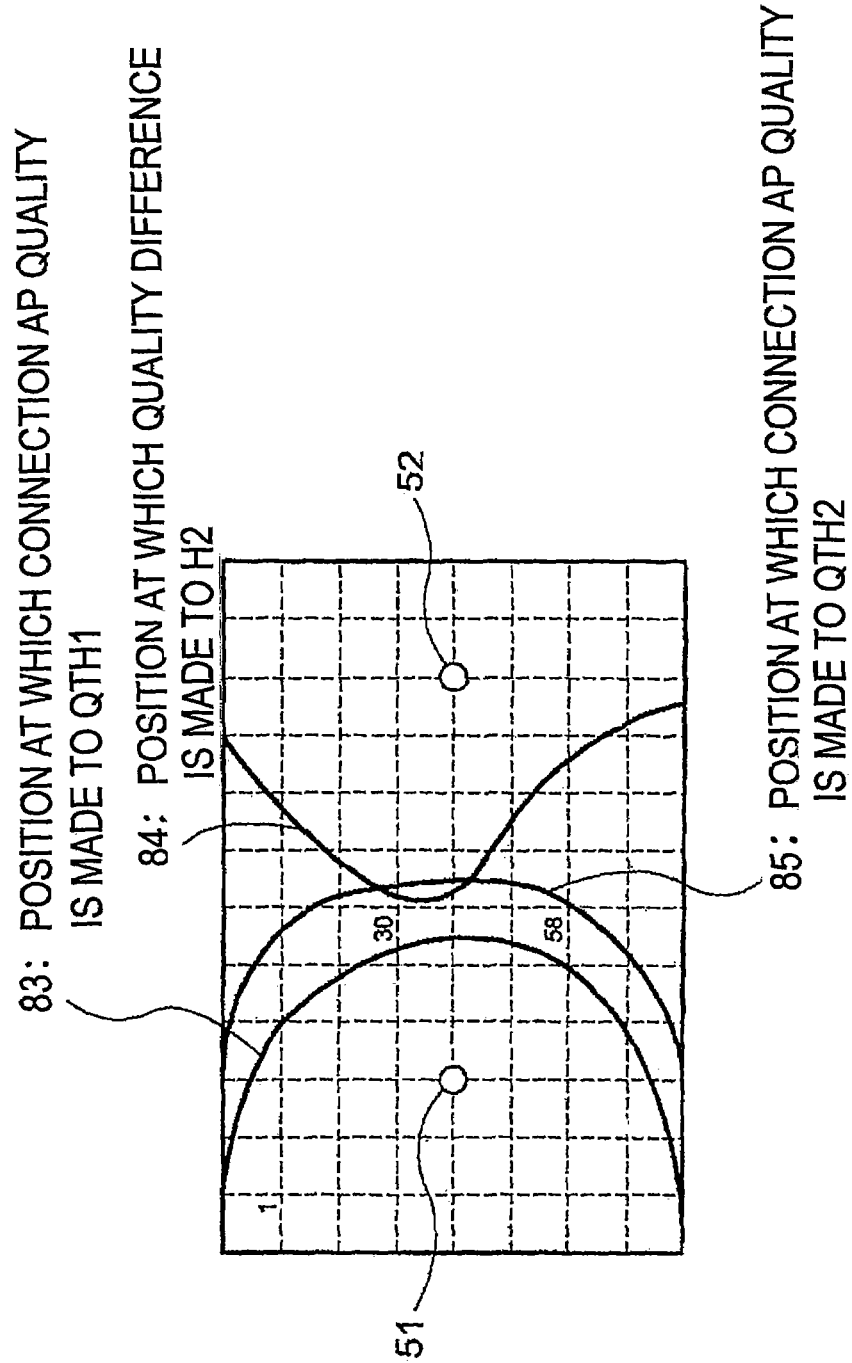
FIG. 8 is a schematic view explaining a second example of the present invention.

Next, a second example according to the second embodiment of the present invention will be explained below to better understand the second embodiment. FIG. 8 is a schematic view explaining the example in which an area to be estimated is partitioned in grids each corresponding to one point-of-observation grid, and identification numbers are given to the grids from an upper left side. Further, two base stations 51, 52 are installed likewise FIG. 5.

It is assumed that the received signal qualities from these base stations to the respective point-of-observation grids are acquired through steps S101 and S102 of FIG. 2, and data as shown in FIG. 9 is obtained in, for example, the respective grids of FIG. 8. One point-of-observation grid is used at step S103, and one base station is used as an associated base station at step S104. It is assumed here that a point-of-observation grid 30 is used as a point-of-observation grid to be estimated, and a base station 51 is used as an associated base station to be estimated.

It is determined at step S105 whether or not the received signal quality from the base station 51 as the associated base station is a connection possible quality in the point-of-observation grid 30. When it is assumed that the connection possible quality corresponds to a received power of −80 dBm, since the received power from the base station 51 is −71 dBm in the point-of-observation grid 17, it is determined that connection is possible. Next, at step S106, a base station having the best received signal quality in the base stations other than the associated base station to be estimated is selected as a hand-over destination base station. In the example, however, since there is only the base station 52 except the base station 51, the base station 52 is selected as the hand-over destination base station, and it is determined whether or not the base station satisfies the connection possible quality. When there are plurality base stations other than the base station to be estimated, a base station having a maximum received power is selected.

Since the received power from the base station 52 in the point-of-observation grid 30 is −67 dBm which is larger than the received power of −80 dBm as the connection possible quality, the base station 52 is selected as the hand-over destination base station. At step S107, it is estimated whether or not the base station 52 is a hand-over area. Here, prescribed values Qth1, Qth2, h1, h2 used to the estimation are −72 dBm, −70 dBm, 3 dB, and 5 dB, respectively.

The received power from the base station 51, which is the associated base station of the point-of-observation grid 30, is −71 dBm, and a difference between the received power of the base station 51 as the associated base station and the received signal quality of the base station 52 as the hand-over destination base station is 4 dB. Since these values correspond to the condition 4 in which a difference of received signal qualities is at least h1 as well as a received signal quality is equal to or more than Qth1 and equal to or less than Qth2, it is estimated that the base station 52 is the hand-over area.

As described above, the hand-over area is estimated to the respective point-of-observation grids in the area to be estimated. A point-of-observation grid 66 is exemplified as an example of a point-of-observation grid which is not estimated as the hand-over area. The received power of the point-of-observation grid 66 from the base station 51 as the associated base station is −71 dBm, and a difference between the received power of the base station 51 as the associated base station and the received signal quality of the base station 52 as the hand-over destination base station is −1 dB. Since the difference of the received signal qualities is −1 dB, neither the condition 3 nor the condition 4 is satisfied, and thus the base station 52 is not estimated as the hand-over area. Note that, in FIG. 8, a curve 83 shows a position at which the received signal quality of a connection access point is made to Qth1, a curve 84 shows a position at which a difference of the received signal qualities is made to h2, and a curve 85 shows a position at which the received signal quality of the connection access point is made to Qth2.

Further, although the right and lower grids are used as adjacent grids in the example, the same estimation may be carried out to all the directions such as up, left, upper right, lower right, upper left, and lower left directions, and the like.

Figure 10:
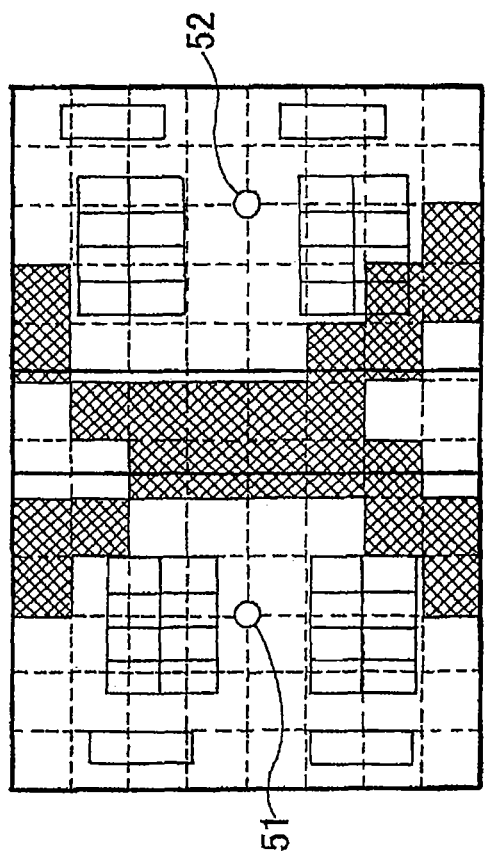
FIG. 10 is a view showing an example of an estimated hand-over area in an overall area to be estimated of FIG. 8.

The hand-over area is estimated as described above using the respective base stations as the associated base stations to be estimated and the respective point-of-observation grids as the point-of-observation grids to be estimated. Although FIG. 10 displays the grids estimated as the hand-over areas in colors such as a red color while overlapping them on a building floor view to be estimated, they are shown by oblique hatchings. A room and desks are shown in a rectangular shape in the floor view. As described above, a location where a hand-over may occur can be easily confirmed by displaying the grids on a map and the building floor view.

Third Example

Figure 11:
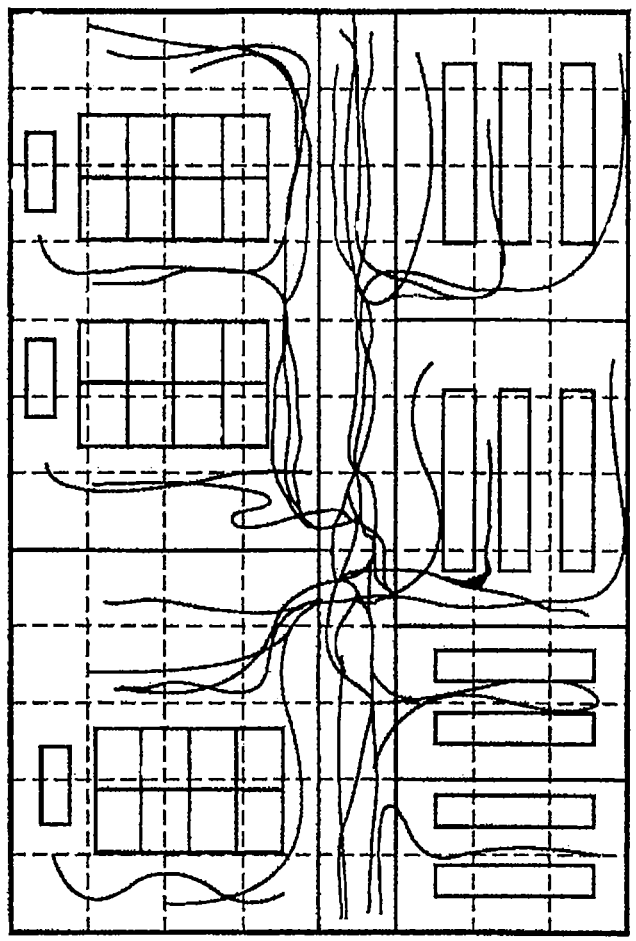
FIG. 11 is a view showing an example of a building floor and traffic lines of users in a third example of the present invention.

Next, a third example according to the third embodiment of the present invention will be explained below to better understand the third embodiment. FIG. 11 shows a floor view of a building to which it is intended to design a wireless communication system and an example of traffic lines of users who make use of the wireless communication system. In the floor view, a room and desks are shown in a rectangular shape, and the traffic lines are shown by curved lines.

Figure 12:
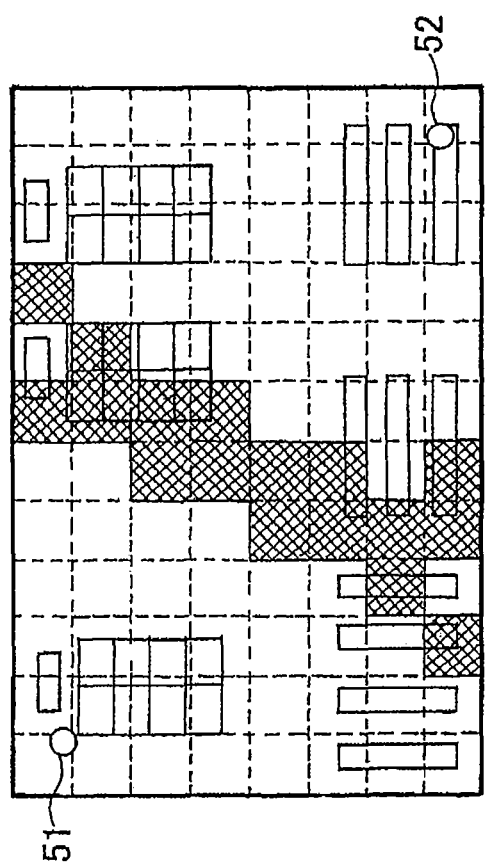
FIG. 12 is a view showing an example of an estimated hand-over area in the third example of the present invention.

First, a hand-over area is estimated to the building to be designed using the method of the first or second embodiment described above (step S301 of FIG. 4). FIG. 12 shows an example of the hand-over area estimated in this case by oblique grid-shaped hatchings. In the example, it is assumed that base station 51, 52 are installed in an upper left portion and a lower left portion of the floor as shown in the figure.

Figure 13:
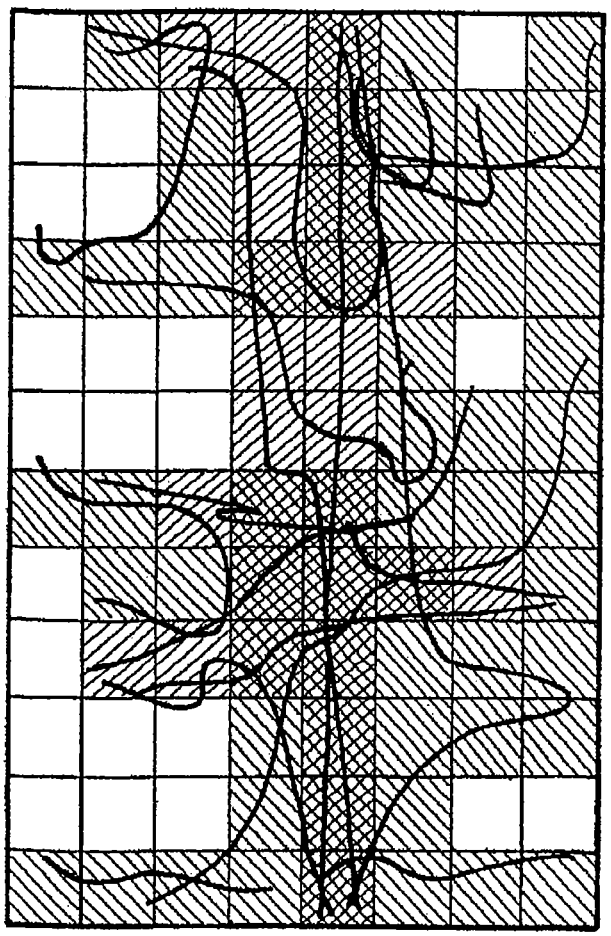
FIG. 13 shows an example of transit frequency of each point-of-observation grid in third example of the present invention.

Next, a transit frequency each point-of-observation grid is found in each of point-of-observation grids (step S302). FIG. 13 shows an example of the thus found transit frequency. In the example, the transit frequency is defined by four steps, that is, transit frequency 1 (lowest) to transit frequency 4 (highest) depending of the density of the traffic lines. Although the point-of-observation grids can be shown by different colors or patterns, in FIG. 13, the transit frequency 1 is shown by white, the transit frequency 2 is shown by lower left oblique hatchings, the transit frequency 3 is shown by lower right oblique hatchings, and the transit frequency 4 or more is shown by oblique grid-shaped hatchings and the like so as to discriminate them.

Figure 14:
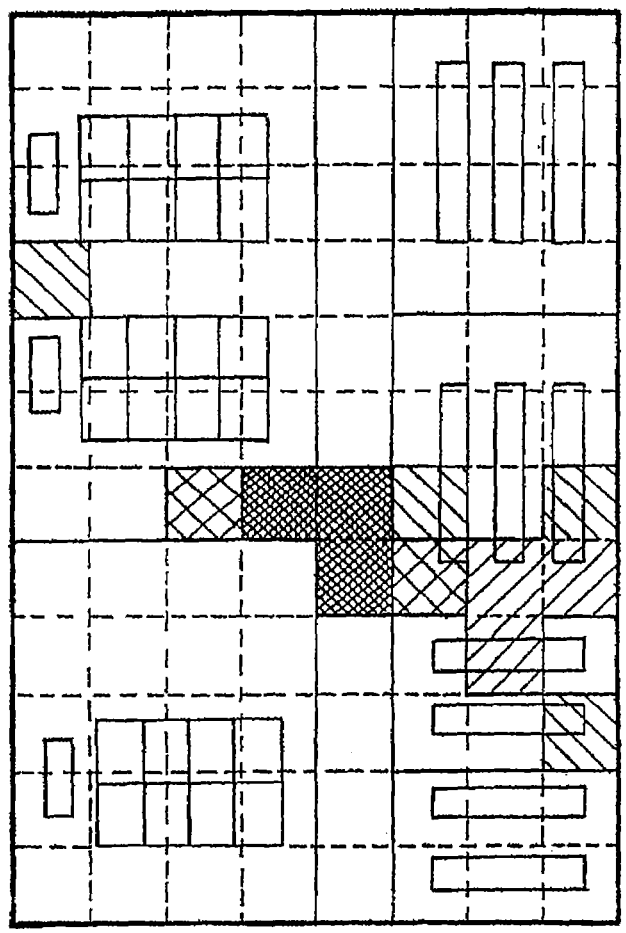
FIG. 14 is a view showing an example of a result of estimation of hand-over frequency in the third example of the present invention.

Thereafter, a hand-over frequency is calculated by coupling a result of estimation of the hand-over area and a result of the found transit frequency (step S303). In the example, the estimated value of the hand-over area is shown by 0 (it is estimated that the building is not used as the hand-over area) or by 1 (it is estimated that the building is used as the hand-over area), and the evaluation is carried out based on the five steps of 0 to 4 by multiplying the estimated values by the transit frequencies 1 to 4. Then, a result of the above calculation is output (step S304). FIG. 14 shows a result of calculation carried out as described above together with a floor view, wherein it is possible to display, for example, a hand-over frequency 0 by white, a hand-over frequency 1 by a lower left oblique hatchings, a hand-over frequency 2 by lower right oblique hatchings, a hand-over frequency 3 by rough oblique grid-shaped hatchings, and a hand-over frequency 4 by dense oblique grid-shaped hatchings.

It can be easily estimated from the result that the hand-over frequency increases in the central portion of the floor and thus deterioration of a received signal quality is predicted. Accordingly, the building can be designed to reduce the hand-over frequency by changing the positions of the base stations and a transmission power by making use of the above result.

Fourth Example

A fourth example of the present invention will be explained to better understand the fourth embodiment of the present invention. The example will be explained using FIGS. 5 and 6 likewise the first example. Referring to FIGS. 5 and 6, the received power of a base station 51 as an associated base station in a point-of-observation grid 18 is −71 dBm, the received power of a base station 52 as a hand-over destination base station is −67 dBm. When it is assumed that prescribed values Qth and h used for estimation are −70 dBm and 5 dBm, respectively, since the received power of the point-of-observation grid 18 is equal to or less than Qth, and a difference between the received power of the associated base station and the received power of the hand-over destination base station is 4 dBm, the point-of-observation grid 18 satisfies the condition 5, and thus it is determined that the point-of-observation grid 18 is a communication unstable area. The communication unstable area is estimated as described above using respective base stations as associated base stations to be estimated and respective point-of-observation grids as the point-of-observation grids to be estimated.

It is apparent that the operation flows of the respective embodiments described above can be previously stored in a recording medium such as a ROM and the like and can be carried out by being read by a computer. Although the value of the received power is used as the received signal quality in the above embodiments, the present invention is by no means limited thereto, and, for example, the error rate of received data, SIR (signal-to-interference wave power ratio), and the like may be used.

The invention claimed is:

1. A received signal quality estimation method of a wireless communication area for estimating an area in which a hand-over occurs in a service area of a wireless communication system composed of a plurality of base stations, the method comprising:
    finding received signal qualities from a plurality of base stations at each grid in the service area; and
    estimating whether or not a target grid is a hand-over area based on a comparison result between received signal qualities from the plurality of base stations at the target grid and received signal qualities from the plurality of base stations at a neighboring grid, which is adjacent to the target grid,
    wherein the target grid is estimated to be the hand-over area when the target grid meets requirements defined by a received signal quality at the neighboring grid from an associated base station and a difference between received signal qualities from the associated base station and a hand-over destination base station.

2. A received signal quality estimation method according to claim 1, wherein at least one of or a combination of received power, delay spread, SNR (signal-to-noise power ratio), SIR (signal-to-interference signal power ratio), propagation loss, and an error rate from the plurality of bases stations are used as the received signal qualities.

3. A received signal quality estimation method according to claim 1, wherein:
    the target grid is estimated to be the hand-over area when the received signal quality at the neighboring grid from the associated base station is equal to or less than a predetermined value Qth, a first difference between received signal qualities from the associated base station and the hand-over destination base station at the target grid is less than a predetermined value h, and a second difference between received signal qualities from the associated base station and the hand-over destination base station at the neighboring grid is equal to or larger than the predetermined value h, or when the second difference between the received signal qualities from the associated base station and the hand-over destination base station at the neighboring grid is equal to or larger than the predetermined value h, the received signal quality at the target grid from the associated base station is larger than the predetermined value Qth, and the received signal quality at the neighboring grid from the associated base station is less than the predetermined value Qth.

4. A received signal quality estimation method according to claim 3, wherein a first distance between the associated base station and the target grid and a second distance between the associated base station and the neighboring grid are further calculated, and when the second distance is larger than the first distance, the target grid is estimated to be the hand-over area.

5. A received signal quality estimation method according to claim 3, wherein the target grid is not estimated to be the hand-over area when the first difference between the received signal qualities from the associated base station and the hand-over destination base station at the target grid and the second difference between the received signal qualities from the associated base station and the hand-over destination bases station at the neighboring grid are equal to or larger than a predetermined value h' which is larger than the predetermined value h.

6. A received signal quality estimation method according to claim 3, wherein when the received signal quality at the target grid from the associated base station is equal to or less than a predetermined value Qth1 and the first difference between the received signal qualities from the associated base station and the hand-over destination base station at the target grid is equal to or more than a predetermined value h1 and equal to or less than a predetermined value h2, or when the first difference between the received signal qualities from the associated base station and the hand-over destination base station at the target grid is equal to or more than the predetermined value h1 and the received signal quality at the target grid from the associated base station is equal to or more than the predetermined value Qth1 and equal to or less than a predetermined value Qth2.

7. A received signal quality estimation method according to claim 3, wherein the grid is estimated to be a communication unstable area, at which hand-over can not be carried out, when the received signal quality at the target grid from the associated base station is equal to or less than the predetermined value Qth and the first difference between the received signal qualities from the associated base station and the hand-over destination base station at the target grid is equal to or less than the predetermined value h.

8. A received signal quality estimation method according to claim 1, further comprising estimating frequency of hand-over based on the hand-over area, which is estimated, and transit frequency of a user.

9. A received signal quality estimation method according to claim 1, further comprising expressing an estimation result of the hand-over area in colors or patterns and displaying the estimation result by overlapping expression of the estimation result on information of constructions.

10. A received signal quality estimation method according to claim 8, further comprising expressing the frequency of hand-over in colors or patterns and displaying the frequency of hand-over by overlapping expression of the frequency of hand-over on information of constructions.

11. A received signal quality estimation apparatus of a wireless communication area for estimating an area in which a hand-over occurs in a service area of a wireless communication system composed of a plurality of base stations, the apparatus comprising:
a finding unit configured to find received signal qualities from a plurality of base stations at each grid in the service area; and
a hand-over area estimation unit configured to estimate whether or not a target grid is a hand-over area based on a comparison between received signal qualities from the plurality of base stations at the target grid and received signal qualities from the plurality of base stations at a neighboring grid, which is adjacent to the target grid,
wherein the hand-over area estimation unit estimates the target grid to be the hand-over area when the target grid meets requirements defined by a received signal quality at the neighboring grid from an associated base station and a difference between received signal qualities from the associated base station and a hand-over destination base station.

12. A received signal quality estimation apparatus according to claim 11, wherein at least one or a combination of received power, delay spread, SNR (signal-to-noise power ratio), SIR (signal-to-interference wave power ratio), transmission loss, and an error rate from the plurality of base stations are used as the received signal qualities.

13. A received signal quality estimation apparatus according to claim 11, wherein:
the hand-over area estimation unit estimates the target grid to be the hand-over area when the received signal quality at the neighboring grid from the associated base station is equal to or less than a predetermined value Qth, a first difference between received signal qualities from the associated base station and the hand-over destination base station at the target grid is less than a predetermined value h, and a second difference between received signal qualities from the associated base station and the hand-over destination base station at the neighboring grid is equal to or larger than the predetermined value h, or when the second difference between the received signal qualities from the associated base station and the hand-over destination base station at the neighboring grid is equal to or larger than the predetermined value h, the received signal quality at the target grid from the associated base station is larger than the predetermined value Qth, and the received signal quality at the neighboring grid from the associated base station is less than the predetermined value Qth.

14. A received signal quality estimation apparatus according to claim 13, wherein the hand-over area estimation unit further calculates a first distance between the associated base station and the target grid and a second distance between the associated base station and the neighboring grid, and when the second distance is larger than the first distance, the hand-over area estimation unit estimates the target grid to be the hand-over area.

15. A received signal quality estimation apparatus according to claim 13, wherein the hand-over area estimation unit estimates the target grid to be the hand-over area when the first difference between the received signal qualities from the associated base station and the hand-over destination base station at the target grid and the second difference between the received signal qualities from the associated base station and the hand-over destination base station at the neighboring grid are equal to or larger than a predetermined value h' which is larger than the predetermined value h.

16. A received signal quality estimation apparatus according to claim 13, wherein the hand-over area estimation unit estimates the target grid to be the hand-over area when the received signal quality at the target grid from the associated base station is equal to or less than a predetermined value Qth1 and the first difference between the received signal qualities from the associated base station and the hand-over destination base station at the target grid is equal to or more than a predetermined value h1 and equal to or less than a predetermined value h2, or when the first difference between the received signal qualities from the associated base station and the hand-over destination base station at the target grid is equal to or more than the predetermined value h1 and the received signal quality at the target grid from the associated base station is equal to or more than the predetermined value Qth1 and equal to or less than a predetermined value Qth2.

17. A received signal quality estimation apparatus according to claim 13, wherein the hand-over area estimation unit estimates the target grid to be a communication unstable area, at which hand-over can not be carried out, when the received signal quality at the target grid from the associated base station is equal to or less than the predetermined value Qth and the first difference between the received signal qualities from the associated base station and the hand-over destination base station at the target grid is equal to or less than the predetermined value h.

18. A received signal quality estimation apparatus according to claim 11, further comprising a frequency estimation configured to estimate the frequency of hand-over based on a combination of information on the hand-over area, which is estimated, and transit frequency of a user.

19. A received signal quality estimation apparatus according to claim 11, further comprising a display unit configured to express an estimation result of the hand-over area in colors or patterns and to display the estimation result by overlapping expression of the estimation result on information of constructions.

20. A received signal quality estimation apparatus according to claim 18, further comprising a display unit configured to express the frequency of hand-over in colors or patterns and to display the frequency of hand-over by overlapping expression of the frequency of hand-over on information of constructions.

21. A non-transitory computer-readable storage medium which causes a computer to estimate an area in which a hand-over occurs in a service area of a wireless communication system composed of a plurality of base stations by:
finding received signal qualities from a plurality of base stations at each grid in the service area; and
estimating whether or not a target grid is a hand-over area based on a comparison result between received signal qualities from the plurality of base stations at the target grid and received signal qualities from the plurality of base stations at a neighboring grid, which is adjacent to the target grid,
wherein the target grid is estimated to be the hand-over area when the target grid meets requirements defined by a received signal quality at the neighboring grid from an associated base station and a difference between received signal qualities from the associated base station and a hand-over destination base station.

22. A non-transitory computer-readable storage medium according to claim 21, wherein at least one of or a combination of received power, delay spread, SNR (signal-to-noise power ratio), SIR (signal-to-interference wave power ratio), propagation loss, and an error rate from the plurality of bases stations are used as the received signal qualities.

23. A non-transitory computer-readable storage medium according to claim 21, wherein:
the target grid is estimated to be the hand-over area when the received signal quality at the neighboring grid from the associated base station is equal to or less than a predetermined value Qth, a first difference between received signal qualities from the associated base station and the hand-over destination base station at the target grid is less than a predetermined value h, and a second difference between received signal qualities from the associated base station and the hand-over destination base station at the neighboring grid is equal to or larger than the predetermined value h, or when the second difference between the received signal qualities from the associated base station and the hand-over destination base station at the neighboring grid is equal to or larger than the predetermined value h, the received signal quality at the target grid from the associated base station is larger than the predetermined value Qth, and the received signal quality at the neighboring grid from the associated base station is less than the predetermined value Qth.

24. A non-transitory computer-readable storage medium according to claim 23, wherein a first distance between the associated base station and the target grid and a second distance between the associated base station and the neighboring grid are further calculated, and when the second distance is larger than the first distance, the target grid is estimated to be the hand-over area.

25. A non-transitory computer-readable storage medium according to claim 23, wherein the target grid is not estimated to be the hand-over area when the first difference between the received signal qualities from the associated base station and the hand-over destination base station at the target grid and the second difference between the received signal qualities from the associated base station and the hand-over destination bases station at the neighboring grid are equal to or larger than a predetermined value h' which is larger than the predetermined value h.

26. A non-transitory computer-readable storage medium according to claim 23, wherein when the received signal quality at the target grid from the associated base station is equal to or less than a predetermined value Qth1 and the first difference between the received signal qualities from the associated base station and the hand-over destination base station at the target grid is equal to or more than a predetermined value h1 and equal to or less than a predetermined value h2, or when the first difference between the received signal qualities from the associated base station and the hand-over destination base station at the target grid is equal to or more than the predetermined value h1 and the received signal quality at the target grid from the associated base station is equal to or more than the predetermined value Qth1 and equal to or less than a predetermined value Qth2.

27. A non-transitory computer-readable storage medium according to claim 23, wherein the grid is estimated to be a communication unstable area, at which hand-over can not be carried out, when the received signal quality at the target grid from the associated base station is equal to or less than the predetermined value Qth and the first difference between the received signal qualities from the associated base station and the hand-over destination base station at the target grid is equal to or less than the predetermined value h.

28. A non-transitory computer-readable storage medium according to claim 21, the computer further estimates frequency of hand-over based on the hand-over area, which is estimated, and transit frequency of a user.

29. A non-transitory computer-readable storage medium according to claim 21, the computer further expressing an estimation result of the hand-over area in colors or patterns and displaying the estimation result by overlapping expression of the estimation result on information of constructions.

30. A non-transitory computer-readable storage medium according to claim 28, the computer further expressing the frequency of hand-over in colors or patterns and displaying the frequency of hand-over by overlapping expression of the frequency of hand-over on information of constructions.

* * * * *

UNITED STATES PATENT AND TRADEMARK OFFICE
CERTIFICATE OF CORRECTION

PATENT NO. : 8,526,980 B2  
APPLICATION NO. : 11/721190  
DATED : September 3, 2013  
INVENTOR(S) : Koichi Ebata Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Fifteenth Day of September, 2015

Michelle K. Lee
*Director of the United States Patent and Trademark Office*